United States Patent [19]

Groen

[11] 4,191,097

[45] Mar. 4, 1980

[54] AIR DEFLECTOR FOR MOTOR VEHICLES

[76] Inventor: Don L. Groen, 1346 Blackhawk Trail - W, Jacksonville, Fla. 32225

[21] Appl. No.: 940,954

[22] Filed: Sep. 11, 1978

[51] Int. Cl.² .............................................. B60J 1/20
[52] U.S. Cl. ..................................... 98/2.12; 98/2.13
[58] Field of Search ............................ 98/2, 2.12, 2.13

[56] References Cited

U.S. PATENT DOCUMENTS

| | | | |
|---|---|---|---|
| 2,281,840 | 5/1942 | Hamilton | 98/2.12 |
| 2,499,127 | 2/1950 | Beard | 98/2.12 |
| 2,519,446 | 8/1950 | Elsebusch | 98/2.12 |
| 2,582,914 | 1/1952 | Reed | 98/2.12 |
| 2,594,682 | 4/1952 | Ritch | 98/2.12 |
| 2,797,126 | 6/1957 | Brooks | 98/2.12 |
| 3,083,630 | 4/1963 | Thaxton | 98/2.12 |
| 3,294,439 | 12/1966 | Phillips, Jr. | 98/2.12 |
| 3,757,663 | 9/1973 | McCarroll | 98/2.12 |
| 3,785,699 | 1/1974 | Molaskey et al. | 98/2.12 |
| 3,803,994 | 4/1974 | McCarroll | 98/2.12 |
| 4,062,272 | 12/1977 | McCarroll | 18/2.12 |
| 4,089,256 | 5/1978 | Furchini | 98/2.12 |

*Primary Examiner*—Henry C. Yuen
*Attorney, Agent, or Firm*—Robert D. Farkas

[57] ABSTRACT

An air deflector for motor vehicles having windows and frames therefor including a semi-flexible sheet, first means for securing the semi-flexible sheet to the uppermost edge of the window frame, second means for securing the lower edge of the semi-flexible sheet to the lowermost edge of the window frame, and means for adjustably deflecting air disposed on the trailing edge of the semi-flexible sheet, the semi-flexible sheet bowing outwardly from the motor vehicle when secured thereto.

5 Claims, 3 Drawing Figures

U.S. Patent  Mar. 4, 1980  4,191,097
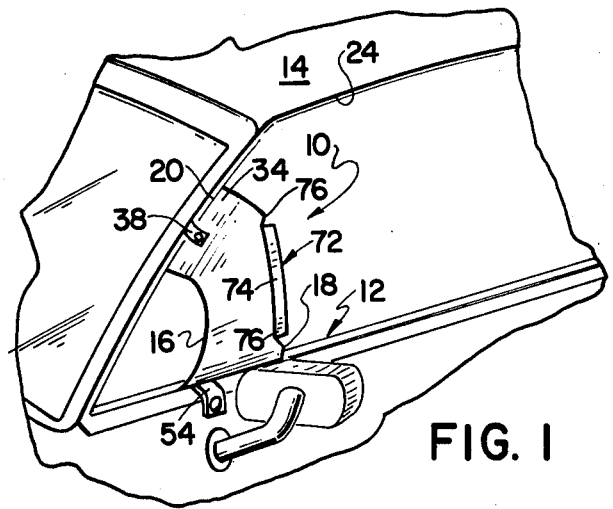
FIG. 1
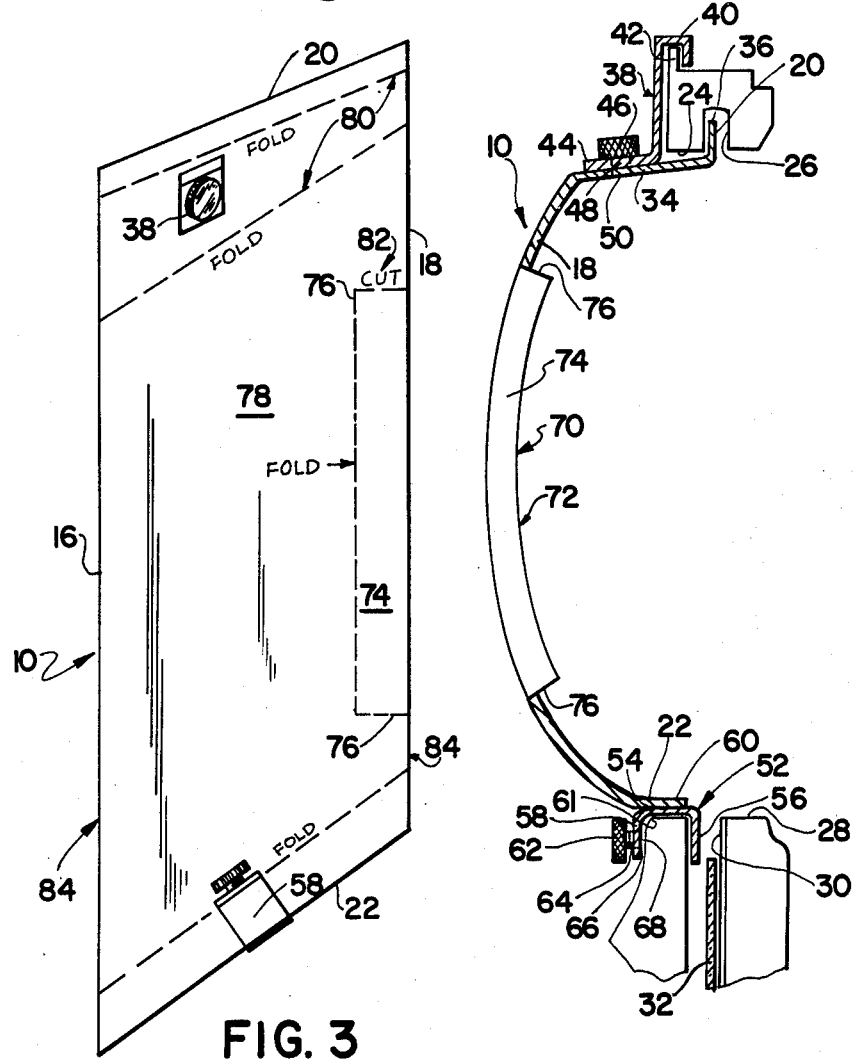
FIG. 3
FIG. 2

AIR DEFLECTOR FOR MOTOR VEHICLES

BACKGROUND OF THE INVENTION

1. Field of the Invention

The present invention relates to air deflectors for motor vehicles, and more particularly, to an air deflector for motor vehicles which is adjustable and also is attachable to the window frame of the motor vehicle.

2. Description of the Prior Art

Presently, both domestic and foreign auto manufacturers have eliminated the wing window from their automobiles. As a result, the ventilation provided by the motion of the automobile has been severely limited. Several devices in the prior art propose means of increasing the air flow. However, most of these devices are difficult to install, offer a limited increase in ventilation, and frequently require an attachment to the window itself which may cause a safety hazard.

U.S. Pat. No. 2,281,840 issued to C. S. Hamilton on May 5, 1942 discloses an air deflector for motor vehicles which includes a sheet of transparent material shaped to provide bottom and rear edges which align and are provided with engaging means engaging between the glass guides and the frame of a window. Once installed, this device provides no adjustability of air deflection, and must be specifically tailored for each style of automobile.

U.S. Pat. No. 2,499,127 issued to N. B. Beard on Feb. 28, 1950 discloses a breeze director which includes a substantially "U" shaped deflector which is affixed to the window by a substantially "U" shaped clamp. The use of this device is limited to attachment to a free edge of a window, therefore, only minimal flexibility in use is provided for. Also, once installed on a window, the window can no longer be freely opened and closed without a possibility of damage to the window of the frame thereof.

U.S. Pat. No. 2,594,682 issued to G. L. Ritch on Apr. 29, 1952 teaches an air scoop for automobiles which provides a semi-cylindrical panel having a pair of spaced elongated ends, a pair of brackets affixed in each of the spaced ends, the brackets for securing the semi-cylindrical panel to an upright window frame provided by the automobile. While some adjustability is provided for ventilation by the pivoting of the air scoop upon the brackets thereof, the air scoop is directly confronted by the air passing the moving automobile which may cause unwanted movement after optimum placement of the scoop.

The present invention overcomes the problems associated with the prior art by providing an air deflector for motor vehicles which may simply and easily be affixed to the window frame of an automobile, and which does not interfere with the use of the use of the window mounted therein.

SUMMARY OF THE INVENTION

Therefore, a primary object of the present invention is to provide an air deflector for motor vehicles which may be adjusted to vary the air flow provided thereby.

A further object of the present invention is to provide an air deflector for motor vehicles which may be simply and easily affixed to the window frame provided by the motor vehicle.

A still further object of the present invention is to provide an air deflector for motor vehicles which maximizes air flow into the passenger compartment of the motor vehicle.

Another object is to provide an air deflector for motor vehicles which does not interfere with the windows thereof.

Another object is to provide an air deflector for motor vehicles which is simple in design, inexpensive to manufacture, and durable.

These objects, as well as further objects and advantages, of the present invention will become readily apparent after reading the description of a non-limiting illustrative embodiment and the accompanying drawing.

An air deflector for motor vehicles having windows and frames therefor according to the principles of the present invention includes a semi-flexible sheet having a leading edge, a trailing edge, an upper edge, and a lower edge; first means for securing the upper edge to the uppermost edge of the window frame; second means for securing the lower edge to the lowermost edge of the window frame; and means for adjustably deflecting air, the air deflecting means disposed on the trailing edge, the semi-flexible sheet bowing outwardly from the motor vehicle when secured thereto.

BRIEF DESCRIPTION OF THE DRAWINGS

In order that the present invention may be more fully understood it will now be described, by way of example, with reference to the accompanying drawings in which:

FIG. 1 is a perspective view of the preferred embodiment incorporating the principles of the present invention therein installed on an automobile;

FIG. 2 is a side view in elevation of the preferred embodiment installed on the motor vehicle of FIG. 1 shown in cross section; and FIG. 3 is a top plan view of the preferred embodiment prior to the installation thereof on a motor vehicle.

DESCRIPTION OF THE PREFERRED EMBODIMENT

Referring now to the figures, and more particularly to FIGS. 1 and 2, there is illustrated therein an air deflector 10 mounted on the window frame 12 provided by a motor vehicle 14. The air deflector 10 provides a leading edge 16, a trailing edge 18, an upper edge 20, and a lower edge 22. The window frame 12 provides an uppermost edge 24 and an upper window slot 26 adjacent thereto. The window frame 12 also provides a lowermost edge 28 and lower window slot 30 adjacent thereto. The upper window slot 26 and lower window slot 30 permit the passage of a window 32 into a closed position.

A substantially "L" shaped folded portion 34 is provided by the air deflector 10 adjacent to the upper edge 20 thereof. The free edge 36 of the substantially "L" shaped folded portion 34 engages the upper window slot 26 as shown. A bracket 38 which provides a hook portion 40 engages a protrusion 42 provided by the window frame 12. The bracket 38 is secured on an end 44 thereof to the air deflector 10 by a first thumb screw 46. The thumb screw 46 provides a threaded shaft 48 which threadably engages an aperture 50 located in the air deflector 10.

The lower edge 22 of the air deflector 10 is secured to the lowermost edge 28 of the window frame 12 by a substantially "U" shaped clamp 52. The substantially "U" shaped clamp 52 includes a base portion 54 and a pair of leg portions 56 and 58. The base portion 54 is fixedly secured to a portion 60 of the air deflector 10 adjacent to the lower edge 22 thereof by a tack weld or the like. The leg portion 56 of the "U" shaped clamp 52 engages the lower window slot 30. The leg portion 58 of the "U" shaped clamp 52 engages an outer portion 61 of the window frame 12. The substantially "U" shaped clamp 52 is clamped in position by a second thumb screw 62 which provides a threaded shaft 64. The threaded shaft 64 threadably cooperates with an aperture 66 located in the leg portion 58 of the clamp 52. When the thumb screw 62 is tightened the threaded shaft 64 thereof engages the portion 61 of the window frame 12. The free end 68 may be provided with a resilient pad or the like to prevent scratching of the window frame 12. When the air deflector 10 is installed as described above, it preferably assumes an arcuate shape as illustrated with the central portion 70 thereof bowing outwardly from the motor vehicle 14.

The degree of air deflected by the air deflector 10 can be varied by the adjustable air deflection means 72 provided thereby. The adjustable air deflection means 72 includes a portion 74 which has been partially severed by a pair of spaced apart slits 76. The portion 74 may be bent into a position desired by the user to direct the flow of air captured by the air deflector 10 into a desired position. Although the portion 74 is illustrated as integrally formed with the body of the air deflector 10, the portion 74 might also be a separate component which is affixed to the air deflector 10 by a suitable means such as a hinge or the like. When the air deflector 10 is installed on the motor vehicle 12 as described, the window 32 thereof is fully operable.

FIG. 3 illustrates a preferred method fabrication for the air deflector 10. A single sheet of semi-flexible material 78 may be employed. The sheet 78 would preferably be a parallelogram in shape as illustrated. The bracket 38 and the substantially "U" shaped clamp 52 would be fixedly secured to the sheet of semi-flexible material 78. Suitable indicia 80 indicating the proper areas for folding of the air deflector 10 into a useful shape would be indicated. Several sets of indicia 80 might be supplied for different models of automobiles. Also, indicia 82 would be used to indicate the proper location for the partial severance of the portion 74 from the air deflector 10. As a result the degree of air deflection provided by the adjustable air deflection means 72 could be varied according to the desires of the user. For greater air deflection a larger portion 74 could be created and for a lesser amount of air deflection a smaller portion 74 could be formed. The free edges 84 of the air deflector 10 would preferably be covered with a suitable material such as vinyl tape or the like to preclude injury to the user thereof. The preferred material for the fabrication of the air deflector 10 is rolled sheet aluminum. The rolled sheet aluminum would be twenty-two gauge, could be anodized to reduce glare, and would preferably be offered in various colors to complement or contrast with the color of the motor vehicle the device 10 is installed on. The air deflector 10 as illustrated is not limited in use to a front window, but also may be employed similarly on the rear windows of a four door automobile.

Therefore, a primary advantage of the present invention is to provide an air deflector for motor vehicles which may be adjusted to vary the air flow provided thereby.

A further advantage of the present invention is to provide an air deflector for motor vehicles which may be simply and easily affixed to the window frame provided by the motor vehicle.

A still further advantage of the present invention is to provide an air deflector for motor vehicles which maximizes air flow into the passenger compartment of the motor vehicle.

Another advantage is to provide an air deflector for motor vehicles which does not interfere with the windows thereof.

Another advantage is to provide an air deflector for motor vehicles which is simple in design, inexpensive to manufacture, and durable.

It will be understood that various changes in the details, materials, arrangements of parts and operation conditions which have been herein described and illustrated in order to explain the nature of the invention may be made by those skilled in the art within the principles and scope of the invention.

Having thus set forth the nature of the invention, what is claimed is:

1. An air deflector for motor vehicles having windows and frames therefor comprising a semiflexible sheet having a leading edge, a trailing edge, an upper edge, and a lower edge; first means for securing said upper edge to an upper edge of said window frame; second means for securing said lower edge to an lower edge of said window frame; and means for adjustably deflecting air, said air deflecting means disposed on said trailing edge, said semi-flexible sheet bowing outwardly from said motor vehicles when secured thereto, wherein said first securing means comprises substantially "L" shaped folded portion provided in said semiflexible sheet adjacent said upper edge thereof, said substantially "L" shaped folded portion engaging an upper window slot provided by said frame, a bracket for engaging said window frame, said bracket affixed to said sheet, said bracket and said substantially "L" shaped folded portion partially encircling said frame and securing said upper edge of said semi-flexible sheet adjacent thereto, wherein said adjustable deflection means comprises a portion of said sheet adjacent said trailing edge thereof being partially severed by pair of spaced apart slits, said slits extending inwardly from said trailing edge, said portion between said slits being positionable in plane substantially transverse to said semi-flexible sheet.

2. An air deflector for motor vehicles as claimed in claim 1, wherein said bracket is affixed to said sheet by a first thumb screw, said first thumb screw cooperating with a threaded aperture located in said sheet adjacent said upper edge thereof.

3. An air deflector for motor vehicles as claimed in claim 1, wherein said second securing means comprises a substantially "U" shaped clamp having a base portion and a pair of leg portions, said base portion being fixedly secured to said semi-flexible sheet adjacent said lower edge thereof, one of said leg portions for insertion in a lower window slot provided by said frame, the other leg for contacting an outer surface of said lower edge of said window frame, and pressure means for clamping said clamp in position.

4. An air deflector for motor vehicles as claimed in claim 3, wherein said pressure means comprises a second thumb screw, said thumb screw for threadably cooperating with a threaded aperture located in said other leg portion, the tightening of said second thumb screw securing said clamp in position.

5. An air deflector for motor vehicles as claimed in claim 1, wherein said semi-flexible sheet is substantially a parallelogram in shape.

* * * * *